(12) United States Patent
Stewart et al.

(10) Patent No.: US 8,434,026 B2
(45) Date of Patent: Apr. 30, 2013

(54) SYSTEM AND METHOD FOR TIME DIMENSION MANAGEMENT FOR A DATA ANALYZING

(75) Inventors: Ian Stewart, Ottawa (CA); Floyd Kelly, Osgoode (CA); Ilse Breedvelt-Schouten, Manotick (CA)

(73) Assignee: International Business Machines Corporation, Armonk, NY (US)

( * ) Notice: Subject to any disclaimer, the term of this patent is extended or adjusted under 35 U.S.C. 154(b) by 1301 days.

(21) Appl. No.: 11/124,907

(22) Filed: May 9, 2005

(65) Prior Publication Data
US 2006/0253475 A1 Nov. 9, 2006

(51) Int. Cl.
G06F 3/048 (2006.01)

(52) U.S. Cl.
USPC ........... 715/835; 715/703; 715/733; 715/764; 715/765; 715/767; 715/783; 715/790; 715/794; 715/813; 715/815; 715/822; 715/823; 715/824; 715/825; 715/963

(58) Field of Classification Search ........... 715/764, 715/776, 963, 703, 733, 765, 767, 783, 790, 715/794, 813, 815, 822, 823, 824, 825, 835
See application file for complete search history.

(56) References Cited

U.S. PATENT DOCUMENTS

| | | | | | |
|---|---|---|---|---|---|
| 2,418,754 | A | * | 4/1947 | Brunet | 355/132 |
| 4,866,611 | A | * | 9/1989 | Cree et al. | 708/112 |
| 5,394,166 | A | * | 2/1995 | Shimada | 345/98 |
| 5,719,826 | A | * | 2/1998 | Lips | 368/29 |
| 5,764,597 | A | * | 6/1998 | Shih | 368/29 |
| 5,898,431 | A | * | 4/1999 | Webster et al. | 715/841 |
| 6,108,640 | A | * | 8/2000 | Slotznick | 705/7.18 |
| 6,397,195 | B1 | * | 5/2002 | Pinard et al. | 705/30 |
| 6,966,037 | B2 | * | 11/2005 | Fredriksson et al. | 715/830 |
| 7,349,920 | B1 | * | 3/2008 | Feinberg et al. | 1/1 |
| 7,457,773 | B2 | * | 11/2008 | Schmidt et al. | 705/35 |

(Continued)

FOREIGN PATENT DOCUMENTS

| CA | 2315389 | 7/1999 |
|---|---|---|
| CA | 2418754 | 7/2003 |

OTHER PUBLICATIONS

Tim Pyron, Sams Teach Yourself Microsoft Project 98 in 24 Hours, 1998, Sams, First Edition, pp. 1-19.*
Ask search q=business+calendar+standard&qsrc=0&o=0&.*

(Continued)

Primary Examiner — Boris Pesin
Assistant Examiner — John Heffington
(74) Attorney, Agent, or Firm — Shumaker & Sieffert, P.A.

(57) ABSTRACT

A time dimension management system is provided for managing time dimension of a data analyzing system for analyzing data stored in a data store based on a time data structure. The time dimension management system comprises a date selector controller and a calendar coordinator. The date selector controller is provided for controlling a date selector that presents to a user a standard calendar and a business calendar. The date selector controller has a standard calendar manager for managing presentation of the standard calendar for allowing the user to select a date on the standard calendar, and a business calendar manager for managing presentation of the business calendar to represent the time data structure that the data analyzing system uses, and allowing the user to select a date on the business calendar. The calendar coordinator is provided for coordinating the standard calendar manager and the business calendar manager to indicate a selected date on the standard calendar and the business calendar.

21 Claims, 9 Drawing Sheets

U.S. PATENT DOCUMENTS

| | | | |
|---|---|---|---|
| 7,472,127 B2 * | 12/2008 | Malloy et al. ............................. 1/1 |
| 7,492,670 B2 * | 2/2009 | Parees et al. ...................... 368/29 |
| 7,533,348 B2 * | 5/2009 | D'Hers et al. ................. 715/764 |
| 7,640,179 B1 * | 12/2009 | Sachedina ...................... 705/7.31 |
| 7,660,823 B2 * | 2/2010 | Clover ........................... 707/805 |
| 7,830,751 B2 * | 11/2010 | Parees et al. ...................... 368/29 |
| 7,840,210 B2 * | 11/2010 | May ............................ 455/414.1 |
| 7,912,747 B2 * | 3/2011 | Sachedina ..................... 705/7.31 |
| 7,966,322 B2 * | 6/2011 | Clover ........................... 707/728 |
| 8,041,618 B2 * | 10/2011 | Oikonomidis .................. 705/35 |
| 8,126,871 B2 * | 2/2012 | Malloy et al. ................. 707/717 |
| 2002/0194163 A1 * | 12/2002 | Hopeman et al. ................. 707/3 |
| 2003/0095149 A1 * | 5/2003 | Fredriksson et al. .......... 345/797 |
| 2003/0101202 A1 * | 5/2003 | Kelkar et al. ................. 707/201 |
| 2003/0171965 A1 * | 9/2003 | Ratzlaff et al. .................... 705/8 |
| 2003/0230890 A1 * | 12/2003 | Perelman ........................... 283/2 |
| 2004/0122820 A1 * | 6/2004 | Malloy et al. ...................... 707/6 |
| 2004/0139102 A1 * | 7/2004 | Vierich et al. ................. 707/102 |
| 2004/0196740 A1 * | 10/2004 | Sachedina ....................... 368/46 |
| 2005/0065910 A1 * | 3/2005 | Welton et al. ..................... 707/2 |
| 2005/0081154 A1 * | 4/2005 | Vogel ............................ 715/710 |
| 2005/0094494 A1 * | 5/2005 | Parees et al. ...................... 368/29 |
| 2005/0132300 A1 * | 6/2005 | Luhrs ............................ 715/776 |
| 2005/0227216 A1 * | 10/2005 | Gupta ............................ 434/322 |
| 2006/0010155 A1 * | 1/2006 | D'Hers et al. ................. 707/102 |
| 2006/0120380 A1 * | 6/2006 | Lu et al. ...................... 370/395.4 |
| 2006/0149609 A1 * | 7/2006 | Stenerson et al. ................. 705/8 |
| 2006/0149778 A1 * | 7/2006 | Clover ........................... 707/102 |
| 2007/0117074 A1 * | 5/2007 | Maurides et al. ............. 434/247 |
| 2008/0183605 A1 * | 7/2008 | Taraboulsi ....................... 705/30 |
| 2008/0195608 A1 * | 8/2008 | Clover .............................. 707/5 |
| 2008/0256133 A1 * | 10/2008 | Frankland et al. .......... 707/104.1 |
| 2008/0300939 A1 * | 12/2008 | Oikonomidis .................... 705/7 |
| 2009/0063403 A1 * | 3/2009 | Malloy et al. ..................... 707/2 |
| 2009/0083638 A1 * | 3/2009 | Gupta ........................... 715/752 |
| 2009/0150223 A1 * | 6/2009 | Sachedina ....................... 705/10 |
| 2009/0157513 A1 * | 6/2009 | Bonev et al. .................... 705/14 |
| 2009/0193004 A1 * | 7/2009 | Reynolds et al. ................. 707/4 |
| 2009/0216569 A1 * | 8/2009 | Bonev et al. ...................... 705/5 |
| 2009/0228485 A1 * | 9/2009 | Handy et al. ...................... 707/7 |
| 2010/0094770 A1 * | 4/2010 | Sachedina ...................... 705/348 |
| 2010/0121877 A1 * | 5/2010 | Fawcett et al. ............... 707/769 |
| 2011/0137732 A1 * | 6/2011 | Averbeck .................. 705/14.66 |
| 2011/0208553 A1 * | 8/2011 | Frankland et al. ........... 705/7.11 |

OTHER PUBLICATIONS

Ask search qsrc=1&o=0&l=dir&q=business+calendar+gre.*
Ask search qsrc=1&o=0&l=dir&q=calendar+different+ti.*
"Graphical indicator for calendar days that have out-of-sync data", *IBM Technical Disclosure Bulletin*, vol. 35, No. 6 (IBM, Nov. 1992), pp. 375-377.
Notification of Transmittal of the International Search Report and the Written Opinion, dated Aug. 17, 2005, Application Serial No. PCT/CA2005/000707.
Canadian Office Action from corresponding Canadian Application Serial No. 2,506,827, dated May 7, 2010 ( 5 pages).

* cited by examiner

EuroMotors North America

Unit Sales

| | Actual | Target | | | | | | | |
|---|---|---|---|---|---|---|---|---|---|
| | 21,493.68 | 5,000.00 | | | | | | | |

2004        Variance: 6,493.68    Owner: Tom Anderson    Last updated: 2004 Aug 30    Currency: Dollars, United States

| | | | | Actual | Target | Tolerance | Bench |
|---|---|---|---|---|---|---|---|
| | | | | Sum | Sum | Average | Sum |
| Q1 | Jan | | ▲ | USD$ 1,250.00 | USD$ 1,000.00 | 10% | USD$ 1,000.00 |
| | Feb | ● | ▲ | USD$ 1,100.00 | USD$ 1,000.00 | 10% | USD$ 1,000.00 |
| | Mar | ● | ▲ | USD$ 1,250.00 | USD$ 1,000.00 | 10% | USD$ 1,000.00 |
| | Total Q1 | ● | ▲ | USD$ 3,600.00 | USD$ 3,000.00 | 10% | USD$ 3,000.00 |
| Q2 | Apr | ● | ▲ | USD$ 1,100.00 | USD$ 1,000.00 | 10% | USD$ 1,000.00 |
| | May | ● | ▲ | USD$ 1,250.00 | USD$ 1,000.00 | 10% | USD$ 1,000.00 |
| | June | ● | ▲ | USD$ 1,250.00 | USD$ 1,000.00 | 10% | USD$ 1,000.00 |
| | Total Q2 | ● | ▲ | USD$ 3,600.00 | USD$ 3,000.00 | 10% | USD$ 3,000.00 |
| Q3 | July | ● | ▲ | USD$ 1,500.00 | USD$ 1,000.00 | 10% | USD$ 1,000.00 |
| | Aug | ● | ▲ | USD$ 1,500.00 | USD$ 1,000.00 | 10% | USD$ 1,000.00 |
| | Sept | | | | | 10% | USD$ 1,000.00 |
| | Total Q3 | ● | ▲ | USD$ 3,000.00 | USD$ 2,000.00 | 10% | USD$ 3,000.00 |
| Q4 | Oct | | | | | 10% | USD$ 1,000.00 |
| | Nov | | | | | 10% | USD$ 1,000.00 |
| | Dec | | | | | 10% | USD$ 1,000.00 |
| | Total Q4 | | | | | 10% | USD$ 3,000.00 |

SYSTEM AND METHOD FOR TIME DIMENSION MANAGEMENT FOR A DATA ANALYZING

FIELD OF INVENTION

The present invention relates to a system and method for time dimension management for a data analyzing system.

BACKGROUND OF THE INVENTION

In organizations, business data, such as financial data and operational data, is typically stored in a data store with time information. In order to assist business users to examine their business data, various data analyzing applications are proposed. Using a data analyzing application, business users can navigate through data in a time dimension relevant to their business. For example, a user may be interested in viewing data from the previous quarter, last January or last year.

Existing data analyzing applications typically support a time dimension having multiple levels of time. Organizations may use a conventional Gregorian calendar to define the time dimension that they use. However, there are various ways of dividing time into levels or a hierarchy of continuous periods that follows certain patterns based on conventional calendars and time designations. For example, time may be divided by Day, Week, Calendar Week, Business Week (less than 7 days), Calendar Month, Lunar or Manufacturing Month (4 or 5 week month), Lunar or Manufacturing Quarter (13 week), Semester and Year.

Also, there are many additions and variations of time divisions into basic units and various summary levels on top of this basic unit set. Companies frequently start their fiscal year, quarter and month differently than those conventional calendar divisions. Companies may see time differently than the real world time. For example, a broadcast company may have a 28-hour day, beginning at midnight on the east coast and ending at midnight on the west coast. Further, time dimension hierarchies are often complicated by the overlap of different periods. In particular, the weekly boundaries do not coincide with the month, quarter and Year boundaries.

Thus, in organizations with fiscal or business calendars that do not align directly with the Gregorian calendar, users need to translate from one to the other in order to comprehend the data in terms of real world time. For example, when a user looks for the impact of a business event that occurred last February, the user needs to know if last February is Q4 or Q1 in their business calendar. Also, some business calendars have complex hierarchies that are difficult to navigate. For example, in a weekly manufacturing calendar, it is difficult to know if week 13 falls in Q1 or Q2.

User interfaces of existing data analyzing applications for time navigation support either Gregorian calendar date selection, or hierarchical navigation of the business calendar dimension. Hierarchical navigation of the business calendar is typically provided using cascading menus. Cascading structures however do not provide visual feedback of the business calendar. Also, they do not show how far along the business is in any given period regardless of granularity. These user interfaces do not have ability to translate between the Gregorian calendar and the business calendar. It is often difficult or unintuitive for users to select time that they are interested.

Therefore, it is desirable to provide a user interface system that allows users to easily understand relationships between a real world calendar and their business calendar.

SUMMARY OF THE INVENTION

It is an object of the invention to provide a system and method for time dimension management that allows easier selection of desired time for a data analyzing system.

According to an aspect of the present invention there is provided a time dimension management system for managing time dimension of a data analyzing system for analyzing data stored in a data store based on a time data structure. The time dimension management system comprises a data selector controller and a calendar coordinator. The date selector controller is provided for controlling a date selector that presents to a user a standard calendar and a business calendar. The date selector controller has a standard calendar manager for managing presentation of the standard calendar for allowing the user to select a date on the standard calendar, and a business calendar manager for managing presentation of the business calendar to represent the time data structure that the data analyzing system uses, and allowing the user to select a date on the business calendar. The calendar coordinator is provided for coordinating the standard calendar manager and the business calendar manager to indicate a selected date on the standard calendar and the business calendar.

In accordance with another aspect of the invention, there is provided a method of managing time dimension of a data analyzing system for analyzing data stored in a data store based on a time data structure. The method comprises the steps of presenting a standard calendar for allowing the user to select a date on the standard calendar, presenting a business calendar that represents the time data structure that the data analyzing system uses for allowing the user to select a date on the business calendar; receiving a date selection by a user on the standard calendar or the business calendar; and coordinating presentation of the standard calendar and the business calendar to indicate a same date on the standard calendar and the business calendar in response to the date selection by the user.

In accordance with another aspect of the invention, there is provided a memory containing computer executable instructions that can be read and executed by a computer for managing time dimension of a data analyzing system for analyzing data stored in a data store based on a time data structure. The memory comprising instructions to execute a method comprising the steps of presenting a standard calendar for allowing the user to select a date on the standard calendar, presenting a business calendar that represents the time data structure that the data analyzing system uses for allowing the user to select a date on the business calendar, receiving a date selection by a user on the standard calendar or the business calendar, and coordinating presentation of the standard calendar and the business calendar to indicate a same date on the standard calendar and the business calendar in response to the date selection by the user.

In accordance with another aspect of the invention, there is provided a propagated signal or its carrier containing computer executable instructions that can be read and executed by a computer, the computer executable instructions being used to execute the method of managing time dimension of a data analyzing system for analyzing data stored in a data store based on a time data structure.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

Figure 1:
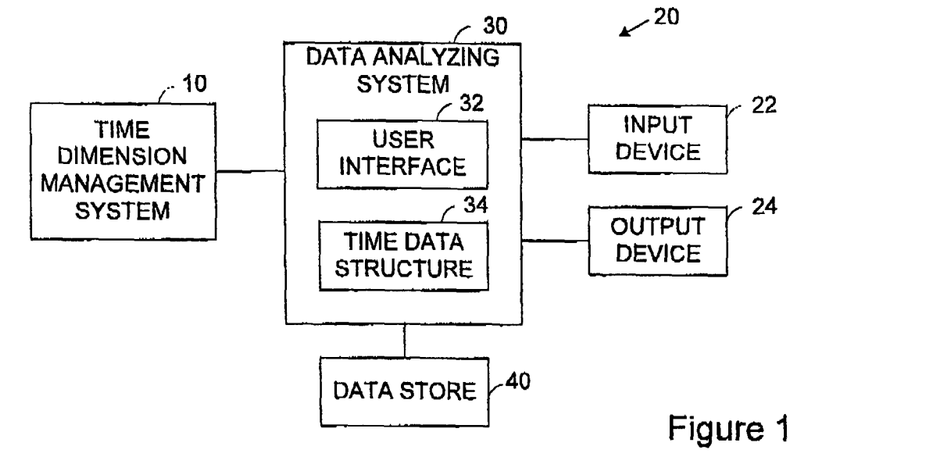
FIG. 1 is a block diagram showing a computer system that uses a time dimension management system in accordance with an embodiment of the invention.

FIG. 1 shows a time dimension management system 10 in accordance with an embodiment of the present invention. The time dimension management system 10 is used in a computer system 20 having an input unit 22 and output unit 24. An organization uses a data analyzing system 30 to analyze business data stored in a data store 40. The time dimension management system 10 is suitably used to manage time dimensions for the data analyzing system 30.

The data analyzing system 30 has a user interface 32 to allow users to analyze business data. The organizations uses its own financial calendar or business calendar having a pre-defined multi-level time hierarchy, or a time data structure 34. The time data structure 34 contains an ordered set of time levels. In each time level has an ordered set of time periods. The ordered set of time periods in each level may comprise a continuous time span with no overlapping periods. For example, the time data structure 34 may contain four levels of time: Days, Periods, Quarter and Year.

The time data structure 34 has two types of members: leaf member and summary member. A leaf member represents values for that member alone. Time periods in summary levels represent the summarization of an adjacent set of one or more leaf time periods. Thus, for each time period, the data analyzing system 30 may provide the value in the period, and various summary information of interest, such as a value of period-to-date one or more of the higher level periods, e.g., Quarter-to-Date and Year-to-Date, and rolling calculations, e.g., 12 month rolling total.

Summarization of time periods in one level to time periods in higher levels is expressed as a set of child-parent relationships. For example, each successive level may represent a summarization of the next lower level. Higher levels represent coarser grain than lower levels. The number of time periods in each level therefore tend to be lower in higher levels. The data analyzing system 30 provides traces of the rollup relationships and relative ordering of periods to determine concepts such as "previous Period", "Same child Period of a Sibling Period" for purposes of providing values of period-to-date periods and for trend calculations.

The data analyzing system 30 may also define a set of special periods in the zero-th level which are aggregations of other time periods. These commonly are used for period-to-date or rolling-sum totals. There are no restrictions on the content of these periods and no requirements of a continuous time span or ordering of periods in the zero-th level.

The data analyzing system 30 may also define a special level "Year", the period numbering is based on the virtual existence of an 'All' parent. A user documentation item will need to be added to tell customers that when staging levels, Year has to get a level ID of 'Y'.

The data analyzing system 30 may provide a primary key to time periods, by which they are referenced. The key consists of two fields, a Level Identifier and a Start date. An end date is an attribute. The combination of these three fields represents a unique key for each time period. Time periods in the same level can be ordered based on the Start date.

The business calendar is often different from a standard calendar, such as a Gregorian calendar, which is used in daily life. The time dimension management system 10 provides visualization of the hierarchy of the business calendar in the context of real time in a standard calendar. Also, Lunar/Manufacturing calendars, which are often used as a business calendar, do not maintain traditional week/month/year boundaries.

The time dimension management system 10 provides a date selector. The date selector may be provided through the user interface 32 of the data analyzing system 30, allowing users to define the context of the data that they wish to view. The date selector provided by the time dimension management system 10 presents both a standard calendar and a business calendar. The standard calendar is typically a conventional Gregorian calendar, but it may be a different calendar. The business calendar represents the time data structure that the organization uses for its business, such as a fiscal year calendar. It presents the hierarchy of the time data structure in an intuitive manner.

The presentation of the standard calendar and the business calendar is coordinated or synchronized such that corresponding dates are visually indicated on both calendars.

Figure 3:
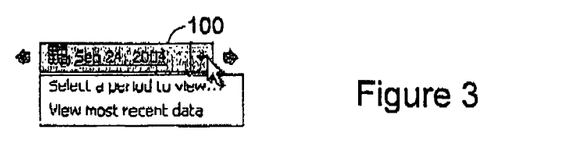
FIG. 3 is a diagram showing an example of a toolbar drop down menu provided by the time dimension management system.
Figure 4:
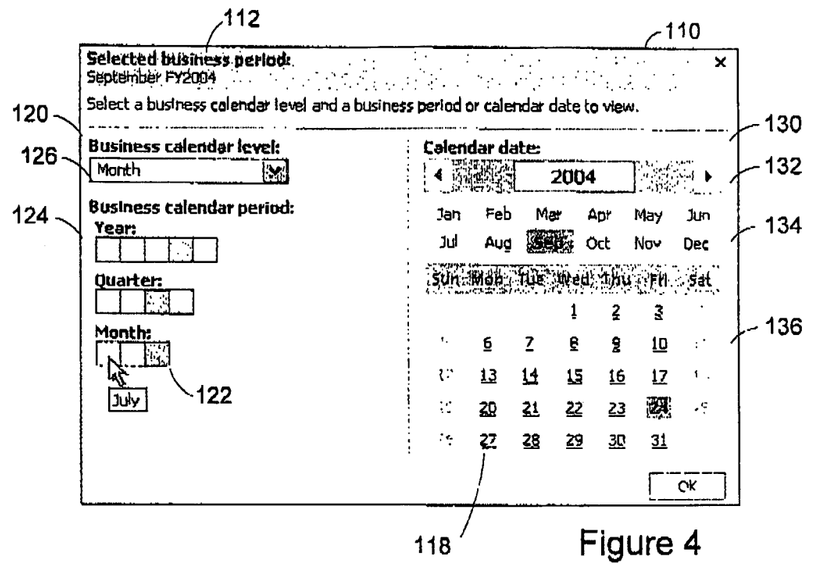
FIG. 4 is a diagram showing an example of a time period selection image provided by the time dimension management system.

FIG. 3 shows an example of a toolbar drop down menu 100 for a date selector. In this embodiment, the toolbar drop down menu 100 provides options: "select a period to view" 102 and "view most recent data" 104. When the user selects the first option 102, a date selector 110 shows the selected period "September FY2004" on the business calendar 120 and Sep. 24, 2004 on the standard calendar 130, as shown in FIG. 4. The date selector 110 has a business calendar 120 and a Gregorian calendar 130. The business calendar 120 has multiple cells 122 that are arranged to represent the hierarchy 124 of the time data structure of the fiscal calendar or business calendar that the organization uses. In this example, the user has selected the business calendar level 126 as "Month", and thus there are the business calendar 120 shows three levels, including year, quarter and month. The Gregorian calendar 130 has a year selection field 132, month selection field 134 and a day or date selection field 136. This example shows that September FY2004 on the business calendar 120 and Sep. 24, 2004 on the Gregorian calendar 130.

Thus, the time dimension management system 10 allows users to easily visualize their business calendar hierarchy and where they are within any given period. It also allows users to easily navigate between relevant periods, for example to view the data for the same period in the previous year or quarter. The time dimension management system 10 enables users to navigate either calendar without knowing or calculating their corresponding periods in the other calendar.

Figure 2:
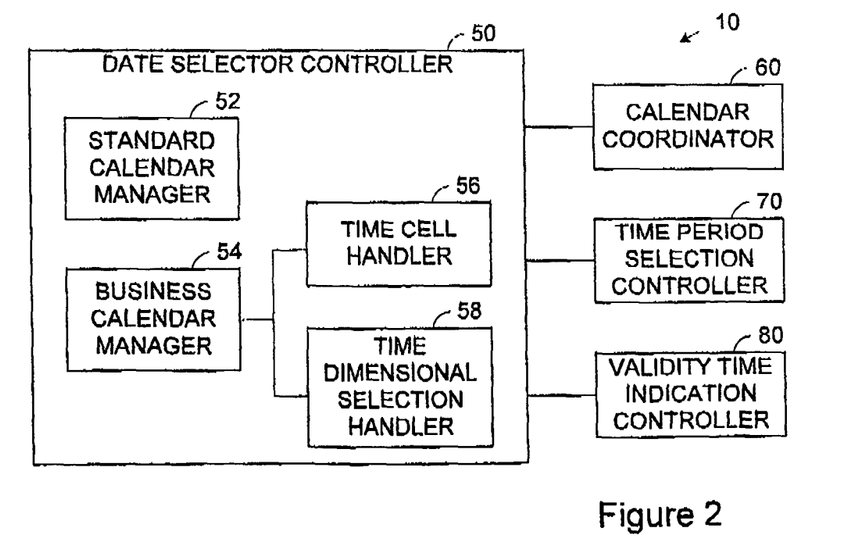
FIG. 2 is a block diagram showing the time dimension management system in accordance with an embodiment of the invention.

FIG. 2 shows details of the time dimension management system 10 in accordance with an embodiment of the invention. The time dimension management system 10 has a date selector controller 50 that provides a date selector having a standard calendar and a business calendar, and allows a user to select a date based on which the user wants to analyze data through the data analyzing system 30.

The date selector controller 50 has a standard calendar manager 52 and a business calendar manager 54.

The standard calendar manager 52 manages presentation of the standard calendar and allows the user to select a date on the standard calendar. In the example shown in FIG. 4, the standard calendar manager 52 presents a conventional Gregorian calendar 130 in which months and days are arranged in a conventional manner. The standard calendar manager 52 may display the a standard calendar 130 in a different arrangement or manner, e.g., by arranging months to correspond to the fiscal year of the organization. For example, if the first day of the fiscal year is February 1 in the organization, the standard calendar manager 52 may present months in the month selection field 134 in sequence starting from February. The standard calendar manager 52 may show in the date selection field 136 those days that are available in the business or fiscal calendar 120 differently from unavailable days. Selection of year, month or date refreshes the display of the other fields to show the available dates of the month.

The business calendar manager 54 manages presentation of the business calendar to represent the time data structure that the organization uses, and allows a user to select a desired date on the business calendar. To represent the time data structure, the business calendar manager 54 may use a time cell handler 56.

The time cell handler 56 provides the business calendar using multiple cells, each representing a unit of the business calendar. The time cell handler 56 handles presentation of the cells based on the time levels of the business calendar in accordance with the time data structure 34 of the data analyzing system 30. The user can select a cell in each level on the business calendar to specify a desired date on the business calendar.

Figure 6:
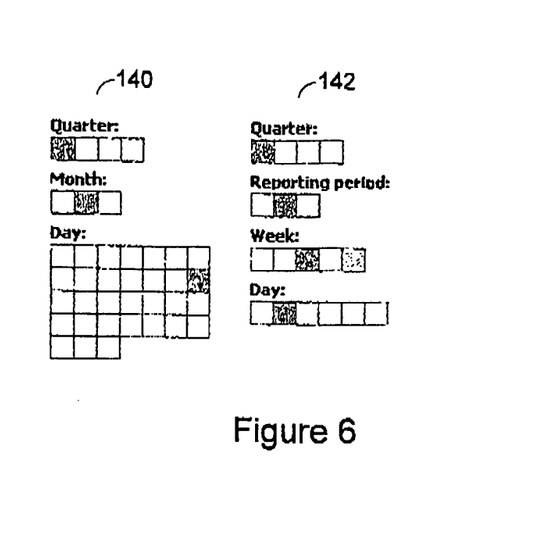
FIG. 6 is a diagram showing examples of a business calendar.

The example shown in FIG. 4 is an example of a business calendar that is presented by the time cell handler 56 using multiple cells arranged in hierarchy. The fiscal calendar 120 has multiple cells 122 arranged to represent the hierarchy of the fiscal calendar having four levels: year, quarter, month and day. Selection of a cell in a level refreshes the display of the cells in other levels. For a different fiscal calendar, there may be fewer or more levels and cells 122 may be arranged differently. FIG. 6 shows different examples 140, 142 of business calendar with cells.

In this embodiment, cells 122 have no labels thereon in order to present a visual representation of the current placement within the fiscal calendar structure. This allows users to navigate to any representative period without having to reselect the child cells of the selected level. Cells 122 may be labeled appropriately in a different embodiment.

The business calendar may be presented in various different ways, as further described below.

The time dimension management system 10 also has a calendar coordinator 60 for coordinating or synchronizing the standard calendar manager 52 and the business calendar manager 54 so as to indicate a same date on both the standard calendar and the business calendar. The calendar coordinator 60 determines the correspondence between the standard calendar and the business calendar using the time data structure 34. The calendar coordinator 60 may provide links, linking each date on the standard calendar with corresponding cells on the business calendar 120. Thus, selecting a date on the standard calendar automatically highlights cells representing the same date on the business calendar, and vice versa. It is a 1:1 relationship between the standard calendar and the business calendar. A calendar date selected on the standard calendar equals a period in the business calendar based upon the time dimension level or rollup level that the user has defined.

In the date selector 110 shown in FIG. 4, hyperlinks 118 are provided to dates on the standard calendar 130, linking each date on the standard calendar with corresponding cells 122 on the fiscal calendar 120. In FIG. 4, the user has selected a date, Sep. 24, 2004, in the Gregorian calendar 130. This date is shown in the business calendar 120 with the highlighted cells of each level, i.e., the third month of the third quarter of the fourth fiscal year. The user can now navigate by date or by period on the business calendar 120 or on the Gregorian calendar 130. The name of the year, quarter, month or day is displayed in a tool tip 112 when the user's cursor hovers over a cell in this display 110.

When the user selects a new date on the business calendar 120 or on the Gregorian calendar 130 the date selector controller 50 automatically updates the view of the Gregorian calendar 130 or the structure view of the business calendar 120.

Figure 5:
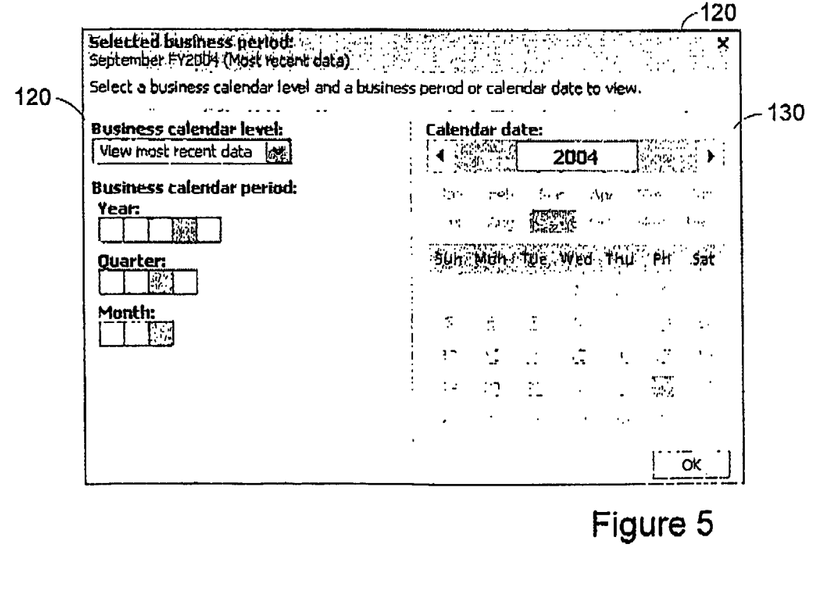
FIG. 5 is a diagram showing an example of a most recent data view image provided by the time dimension management system.

When the user selects the second option "View most recent data" 204 from the toolbar drop down menu 200 shown in FIG. 3, the date for the most recent data is shown in the business calendar 120 and the standard calendar 130 as shown in FIG. 5.

In the date selector 110, 120 shown in FIGS. 4 and 5, the date selector controller 50 provides side by side navigation of the business calendar 120 and the Gregorian calendar 130. Users can use the date selector to scroll through forward or backward, through fiscal years; select a reporting period as defined by the fiscal calendar; select a day of the reporting period for which to show data; and jump to the most recent data in the data store. The date selector controller 50 allows users to navigate the reporting periods of their respective companies regardless of the type of fiscal calendar 120 used, while also maintaining some sense of orientation of location in a typical real world calendar 130. In a different embodiment, a standard calendar and a business calendar may be arranged differently on a display.

In the above example, the business calendar manager 54 provides a business calendar with multiple cells to represent the time data structure of the business calendar. When an organization uses a custom calendar which does not contain standard time definitions, a different form of a date selector may be useful.

Referring back to FIG. 2, the business calendar manager 50 may use a time dimensional selection handler 58 for presenting a time dimensional selector or rollup selector as a business calendar. The time dimensional selection handler 58 allows the user to select a time period defined by the time data structure 34 of the data analyzing system 30. Thus, the user can set the context of each level at which the user navigates the calendar. For example, if the user selects quarter, the user navigates the quarters of the business calendar and the data displayed in the main user interface is aggregated to the quarter. If the user changes the rollup to months, the aggregation displays the month level and the time line navigated at the month level. The time dimensional selection handler 58 may represent time levels of the data structure 34 in a tree structure or using a drill down mechanism that allows users to select the individual time level properties.

Figure 7:
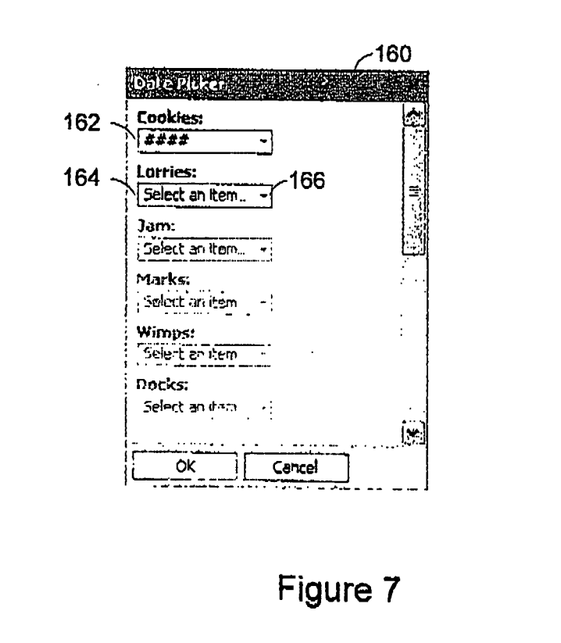
FIG. 7 is a diagram showing an example of a time dimensional selector.

FIG. 7 shows an example of a time dimensional selector 160 presented by the time dimensional selection handler 58. This time dimensional selector 160 represents a custom calendar having multiple time levels 162, e.g., "Cookies", "Lorries", "Jam", and so on. Time levels are dictated and populated by the time data structure 34. Each time level has one or more time items 164. Time items in each time levels are provided using a pull down window 166.

Using the time dimensional selector 160, the user can select a time item in each level that the user wishes to view. Selecting one level causes the next level becomes enabled, and allows the user to make a selection of a time item on the next level. This continues until all levels provided in the time dimensional selector 160 are selected. The combination of the selected time items in the levels correspond to a date or dates in the standard calendar. The calendar coordinator 60 provides links between the standard calendar manager 52 and dimensional selection handler 58 so that selecting a set of time items in the dimensional selector 160 automatically shows a corresponding date or dates in the standard calendar, and vice versa.

The time dimensional selection handler 58 allows the user to set the time level selection to the lowest defined level in the time dimensional selector. In this example 160, if the user selects an item at the "Cookies Level", the user would only be able to select time level selections appropriate to that level.

Referring back to FIG. 2, the time dimension management system 10 may have a time level selection controller 80 for presenting a time level selector. The time level selection controller 80 allows the user to select a time level at which the user wishes to view the data. The time level selection controller 80 may provide a time level selector in a form of a roll-up control.

Figure 8:
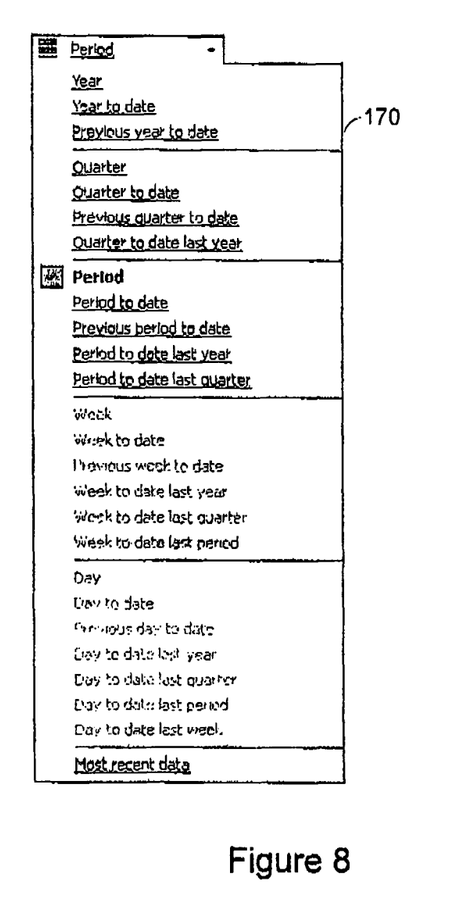
FIG. 8 is a diagram showing an example of a time level selector.

FIG. 8 shows an example of a time level selector 170. The available selections are defined by the time data structure 34. In the example shown in FIG. 8, time levels available for selections are shown in a normal tone and unavailable time levels are shown in a halftone. Not all time levels are available for selection in FIG. 8 because the lowest time level of the date/time selection has not been selected. Availability of time levels are determined depending on the selections in the time dimensional selector. This example represents the view of a data store that is only defined down to the "period" level. To make the lower time level selections available, the user may open the dimensional selector and identify the details of the lower time levels. When the user uses a date selector, the lowest level "Day" is defined and all time levels are shown available.

When the user selects a date on the standard calendar or the business calendar or using the time dimensional selector, selecting a time level specifies a period for which the data is viewed. The period starts from the date selected on the standard calendar or on the business calendar or by the time dimensional selector.

The time level selector 170 shown in FIG. 8 allows the user to see options of year, quarter, period, week, day and view most recent data. In a different embodiment, this type of time level selector may be amalgamated into the main calendar selector to set the navigation context and to make the calendar display simpler.

Figure 13:
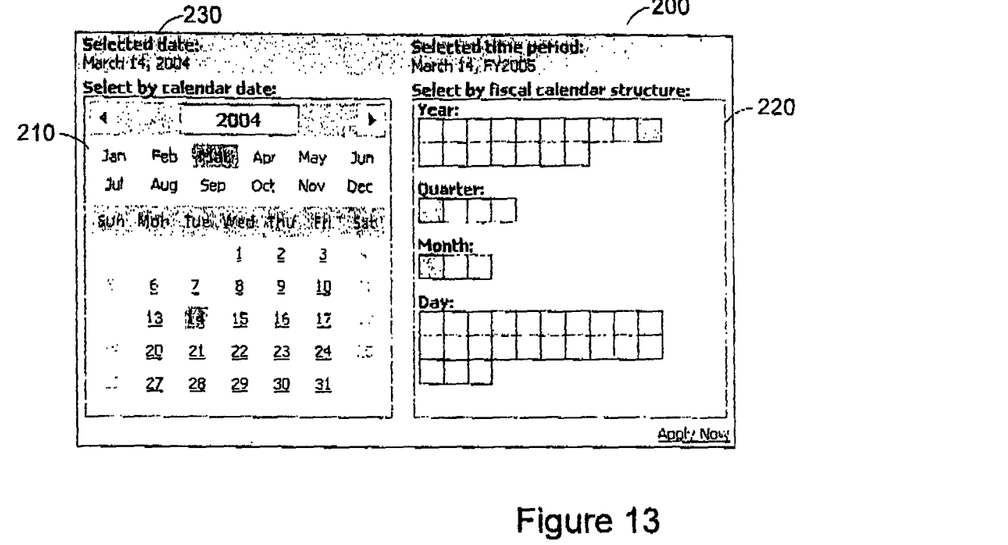
FIG. 13 is a diagram showing an example of a date selector image.

FIG. 13 shows a date selector 200 in accordance with another embodiment of the invention. The date selector 200 has a Gregorian calendar 210 and a fiscal calendar 220. In FIG. 13, the user has selected a date, Mar. 14, 2004, on the Gregorian calendar 210. This date is shown in the fiscal calendar 220 with the highlighted cells of each level, i.e., the 10th day, of the 1st month of the 1st quarter of fiscal year 2004. The user can now navigate by date or by period on the Gregorian calendar 210 or on the fiscal calendar 220. The name of the year, quarter, month or day is displayed in a tool tip 230 when the user's cursor hovers over a cell in this display 200.

Figure 14:
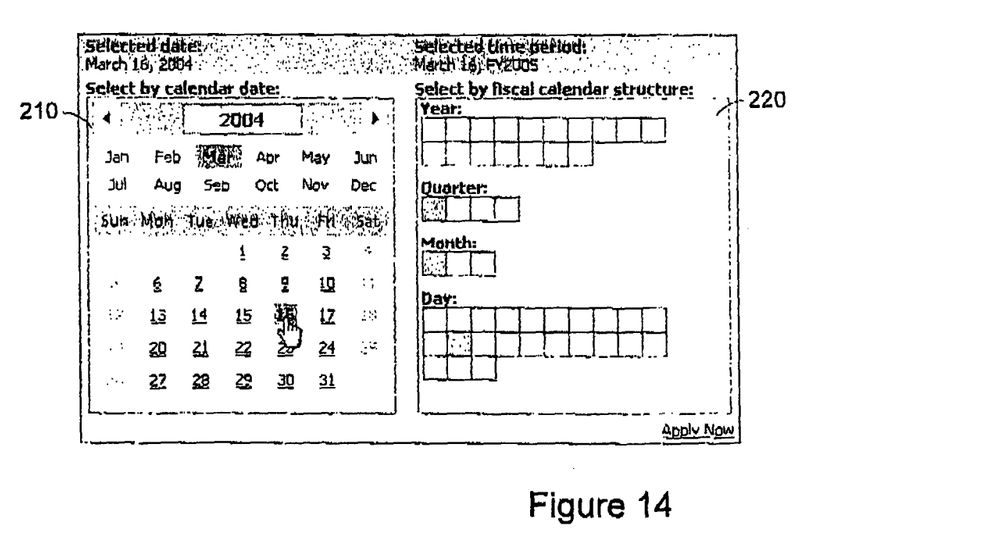
FIG. 14 is a diagram showing another example of a date selector image.

FIG. 14 shows that the user now selects on the Gregorian calendar 210 Mar. 16, 2004. This selection of a different date automatically updates the structure view of the fiscal calendar 220.

Figure 15:
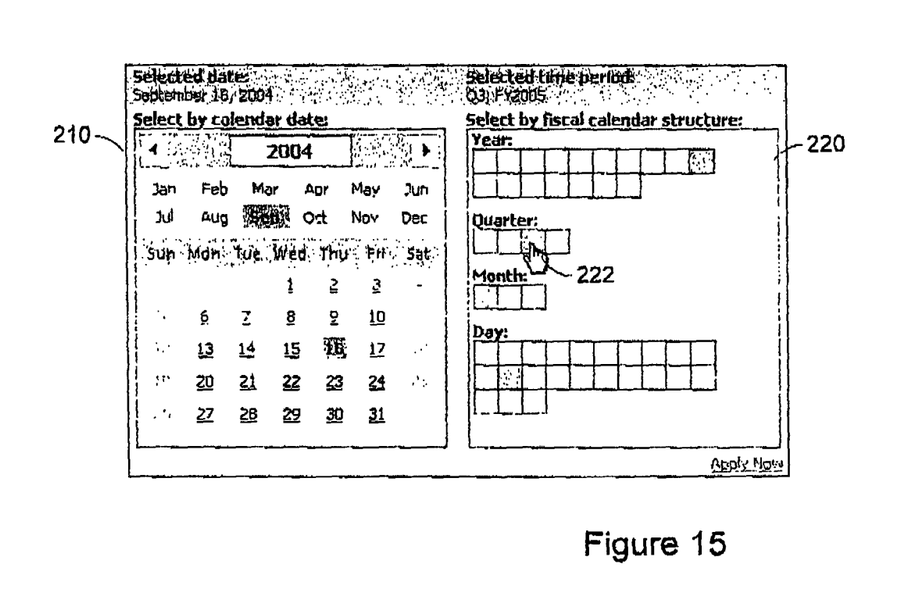
FIG. 15 is a diagram showing another example of a date selector image.

In the example shown in FIG. 15, the user chooses to view the same relative day and month in the third quarter 222 on the business calendar 220. This selection automatically updates the Gregorian calendar 210 to show Sep. 16, 2004. This navigation allows users to quickly move from one contextual time to another with little to no effort.

Figure 9:
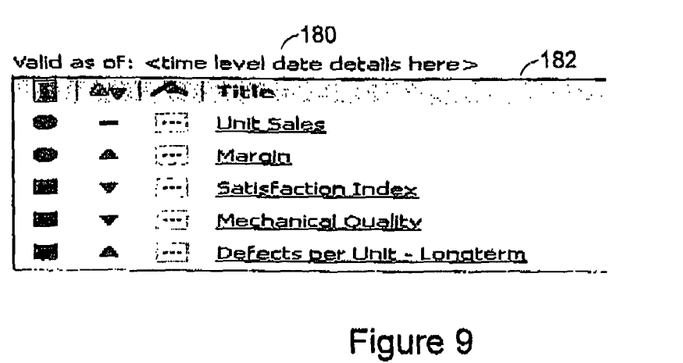
FIG. 9 is a diagram showing an example of a validity date indicator.

The time dimension management system 10 may also have a validity date indication controller 90. The validity date indication controller 90 provides an indication of a validity date that identifies when the data was published. As shown in FIG. 9, a validity date indication 180 may be provided with or adjacent to the data or data options 182 presented by the data analyzing system 30.

A time dimension that defines the levels of time differs from other dimensions. Each time period is part of a continuum of periods. In analyzing business data, users are often interested in both the quantity in a period and the cumulative value for that period for either some fixed number of consecutive periods or relative to the start of any one of its parent periods. Data is added to a data analyzing application in time period based increments. The most recent time period may be in progress and have only partial data.

The calendar control described above affects date selection throughout the user interface 32 of the data analyzing system 30. The affects of the data selection are described using a metric data analyzing system that provides metric views of data. The time data structure of the metric data analyzing system has the following features.

Three concepts define a time dimension: time levels structure, time periods structure and time relationships structure. These structures have the following attributes that are used for time calculations.

The time levels structure has attributes: Level Identifier (unique among levels), Language Text Id (to get Level Name), Level Number (numeric; indicating position in Level Hierarchy. 1 indicates the highest level; 0 is reserved for internal use), and Reference Display Level ID (used as a default for the "latest view" feature in the UI).

The time periods structure has attributes: Time Period ID, Level Identifier (link to TIME_LEVELS), Start Time Code, End Time Code, Language Text Id (to get Level Name), Child Count (a count of children in the next lower level), Internal fiscal year value (fiscal year value used for internal purposes only), Period number (the order of period under a given parent level member), Previous period identifier (represents the identifier of the previous period in the same level), Period type (internal use), and Reference level identifier (internal use).

The time relationships structure contains attributes: ParentIdentifier (link to Time Periods Table), and ChildIdentifier (link to Time Periods Table).

Also, a time language text structure is used to provide multi-lingual representation of period and level display strings. Attributes include: Language_Text_Id, Language_Cd, Short_Name, and Long_Name.

Certain periods may be used to calculate period-to-date comparison values. These values are calculated as of specified "Reference" periods. There is one Reference period in each time level. Reference periods are set at the time of data load. The Reference period for each time level can be explicitly set by the administrator or be defaulted from the current date (at the time that the loader is run).

If a Reference period for a time level is not explicitly set, it is assumed to be the most recent completed full time period of that level. For example, an application with Year, Quarter, Month, and Day time levels loaded on Nov. 17, 2004 would have the following default Reference periods:

Nov. 16, 2004 in the day level,
October 2004 in the month level,
Q3, 2004 in the quarter level,
2003 in the year level.

A set of special cumulative time periods are provided based on the Reference periods. In the general case, there is one cumulative period for each for each higher-level period that exists for each Reference period.

In the example given above, the Cumulative periods would be:
For November 16:
  Month-to-date at daily grain for November 16
  Quarter-to-date at daily grain for November 16
  Year-to-Date at daily grain for November 16.
For October 2004
  Quarter-to-date at monthly grain for October.
  Year-to-date at monthly grain for October.
For Q3 2004
  Year-to-date at quarterly grain for the 3rd quarter.

In many situations, such as when the significant period coincides with a higher level boundary, some or all of the significant periods mentioned are redundant to periods which are already in the time dimension. In such cases, the redundant significant period will not be created.

For each cumulative time period there are a set of one or more comparative time periods with similar time duration in an earlier time scale. Continuing the example from the previous section, the cumulative time period:
  Month-to-date at daily grain for November 16
has 3 potential comparative time periods. They are:
  Month-to-date at daily grain for October 16 (Same period in previous month)
  Month-to-date at daily grain for August 16 (Same period in the same relative month in previous quarter)
  Month-to-date at daily grain for Nov. 16, 2003 (Same period in the same relative month in previous year).

Values for comparison periods should not be staged since they will be generated by MMLOADER. The user might be required to stage localized names for those periods though in the case of a custom calendar.

Trend calculations are based on a comparison of one time period with a corresponding earlier time period. By default, trend is based on the immediately previous similar time period. For example, the trend for Quarter 2, 2004 is based the comparisons of values from Quarter 1, 2004. The trend for Quarter 1, 2004 is based on a comparison of values from Quarter 4, 2003.

However, the trend of interest to a customer may not be to the immediately preceding similar period but to a similar period in a previous higher level. In the continuing example, a customer may be more interested in the trend from Quarter 4, 2003 to Quarter 4, 2004 than the trend from Quarter 3, 2004 to Quarter 4, 2004.

Two methods for users to generate or modify their time dimensions are provided: generating standard time dimension based on predefined levels, and generating a time dimension from tables.

In the method of generating standard time dimension based on predefined levels, a time dimension can be generated consisting of one or more of the standard date levels, such as: Fiscal/Calendar Year, Fiscal/Calendar Quarter, Lunar Quarter, Fiscal/Calendar Month, Lunar Month (4 Weeks), Week (5, 6 or 7 day), and Day. Various parameters specify the beginning and end period, the number of days in a week and fiscal period boundaries.

In the method of generating a time dimension from tables, the Time Dimension Staging table will be expended to provide a means to define each period and each relationship to the loader.

A single time granularity must be chosen for each measure. Values loaded that are at a lower level of granularity then the will be rejected. Values loaded which are at a higher level of granularity will be allocated to the stated level by an allocation formula. For a metric type (measure) that is not flagged as STAGED (user provided rollups) data is expected to come in at only one constant level for each value type.

The following allocation formulas may be allowed:
  Proportional to the number of lower level time period members (20 days)
  Proportional to the ratios of a stated "Benchmark Period". (7 days)
  Proportional to a "template Measure" for the same time period. (8 days)

Both Template Measure and Benchmark Period are attributes of a measure. Benchmark period also has a "Global" default value. All allocations and summarizations are performed during the loading process.

A metric data analyzing system model with no data and no generated time periods can have unlimited changes to its structure. Once Time periods are entered, changes are limited to the following:
  New Time periods can be added to the end.
  Old time periods (and associated data) can be removed from the beginning.
  Granularity levels for existing Measures can be modified. Levels can be added or removed. Parent Child relationships can be altered.

Where data is created, new data will not be added until the next load. Where data is destroyed, the data will be removed at the time of the structural change.

Different measures and Value types have different time granularities. Actual values may be recorded at the daily level but target Values set at the monthly level. The metric data analyzing system offers a form of Variable Measure Granularity in that some measures can be entered at the daily level and summarized at the Period level or entered at the Period level and allocated.

In this metric data analyzing system, the calendar control and associated time level selector affect the data views, such as metric list values (on scorecard, metric type, owner, group or objective), history chart, history list and actions tab.

The values displayed on a metric list are controlled by the calendar control. In a recent data view, the values displayed are the most recent actual values available for each list, and at the lowest available time grain. For example, if revenue is provided monthly and bug count daily, both the most recent daily bug count and the revenue for the most recent month are displayed.

When specific times and time levels are selected, the metric list view displays all metrics, but only the values available for that time and time level. Metrics available only at a higher time grain (e.g. months or quarters) are displayed as "under construction" when viewing at a lower time grain such as days.

Figure 10:
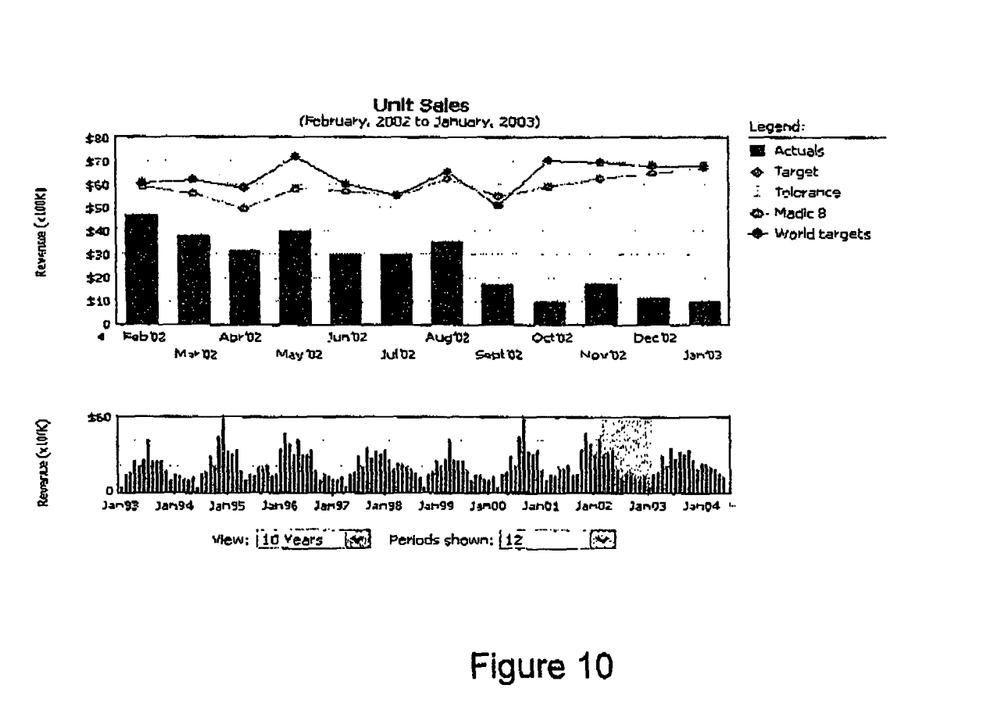
FIG. 10 is a diagram showing an example of a metric history chart.

The time levels and range displayed by a history chart may be controlled by the calendar control of the time dimension management system 10 or by local controls as defined in a History Chart specification of the data analyzing system 30. For example, the metric history chart may be displayed such that in recent data view, the history chart displays bars at the lowest time grain available for this metric. The number of bars displayed is defaulted per the History Chart specification. If a specific date and time level is selected in the global calendar control, it sets the default level and initial time period for the history chart. The user may navigate away from this view using the local history chart navigation controls. However, if a new global calendar date and level are selected, this overrides any local history chart navigation settings. A sample view is shown in FIG. 10.

Figure 11:
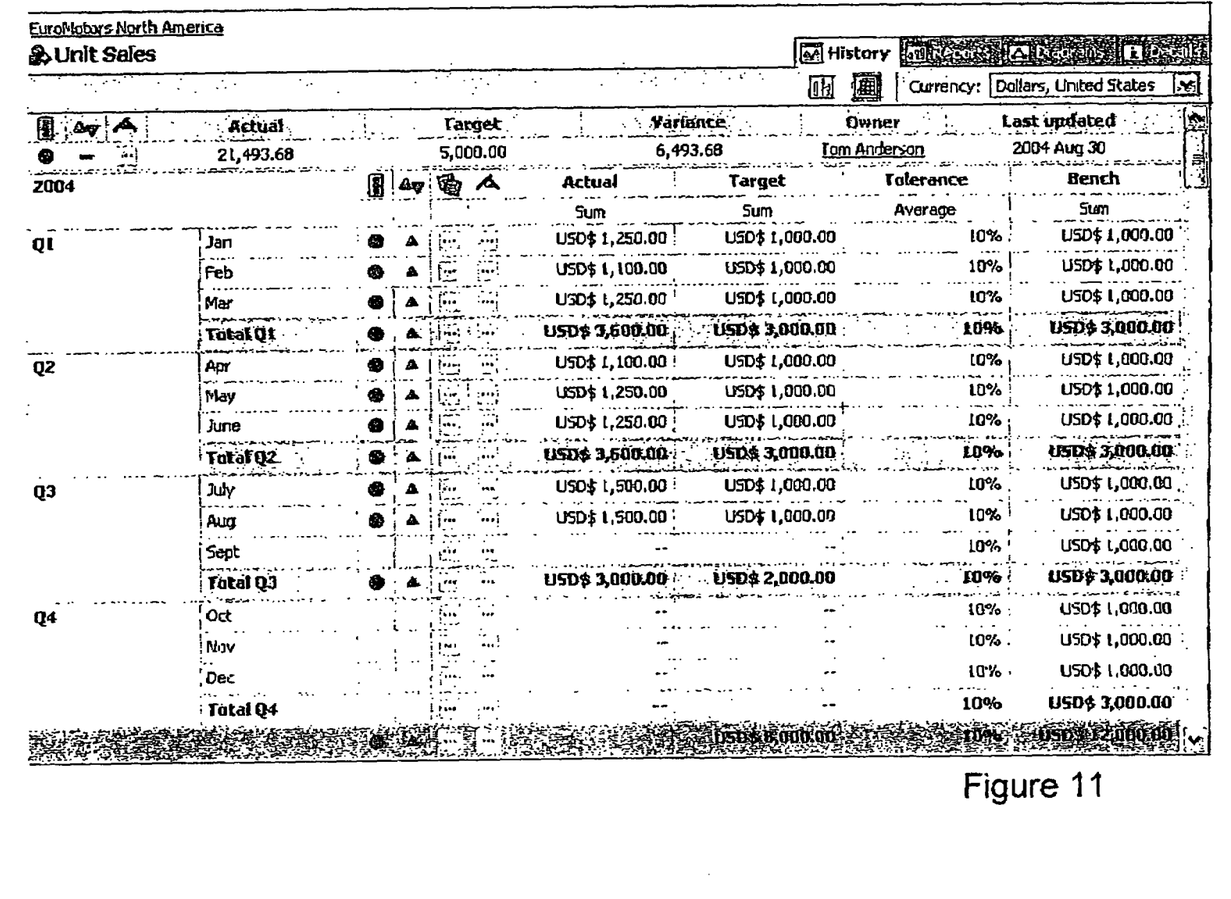
FIG. 11 is a diagram showing an example of a metric history list.

A metric history list displays available periods and levels for the year selected in the global calendar control. Thus, the global time level drop down may be disabled when the user is viewing metric history list displays. In recent data mode, the most recent year in which data exists for this metric is displayed. A sample view is shown in FIG. 11.

Figure 12:
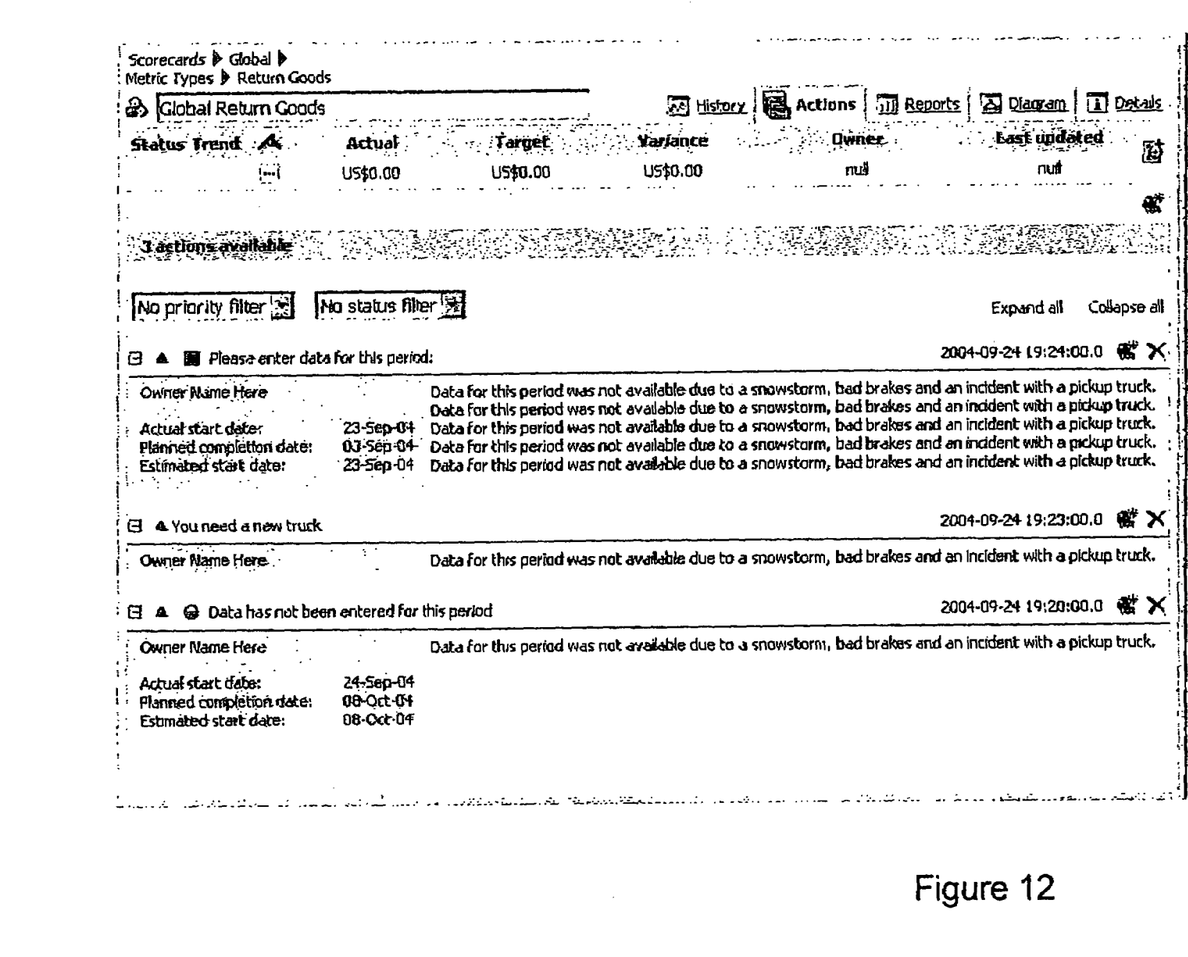
FIG. 12 is a diagram showing an example of an action tab.

The data analyzing system 20 may also provide an action display, as shown in FIG. 12. The actions display displays actions associated with the currently selected period as well as those for which action is required and has not been completed. In recent data view, actions for the period in which the most recent actual value is available is displayed.

As described above, the calendar control provided by the time dimension management system 10 is flexible enough to allow users to navigate a fiscal year, regardless of the type of business calendar that is employed by the organization. The time dimension management system 10 allows users to navigate periods of their business while maintaining a grounding in a real world calendar, e.g., a Gregorian calendar. When the time dimensional selection handler 58 is used, the time dimension management system 10 can also provide a mechanism that supports arbitrary custom defined business calendars, e.g., non-time related calendars.

The time dimension management system of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal or its carrier are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A time dimension management system comprising:
a computer; and
a date selector controller, executable by the computer, to control a date selector that displays a standard calendar and a business calendar, the date selector controller comprising:
a standard calendar manager to display the standard calendar to allow user selection of a time period, the standard calendar representing a standard time data structure; and
a business calendar manager to display the business calendar, the displayed business calendar representing a business time data structure different from the standard time data structure, the business time data structure comprising two or more separate time levels, each of the two or more separate time levels representing a respective independent set of time periods, wherein each independent set of time periods is associated with a different unit of time, wherein at least one time period of one of the independent sets of time periods has a duration that is different from the time period included in the standard calendar, wherein each of the independent sets of time periods includes a respective continuum of time periods, wherein the displayed business calendar comprises multiple selectable cells each corresponding to a time period of a respective independent set of time periods, and wherein the multiple selectable cells of the displayed business calendar are graphically arranged to represent a hierarchy of the two or more time levels,
wherein the date selector controller provides a visual, side-by-side navigation of both the standard calendar and the business calendar, such that when a new time period is selected in one of the displayed standard calendar and the displayed business calendar, the date selector controller automatically updates a view of the other calendar to visually indicate the selected new time period.

2. The time dimension management system as recited in claim 1, further comprising:
a calendar coordinator, executable by the computer, to coordinate the standard calendar manager and the business calendar manager to visually indicate the selected new time period in both the standard calendar and the business calendar based at least in part on the respective standard and business time data structures,
wherein the business calendar manager further comprises a time cell handler to present the multiple selectable cells of the business calendar.

3. The time dimension management system as recited in claim 1, wherein the business calendar manager further comprises a time dimensional selection handler to present the business calendar as a time dimensional selector for selecting at least one time period in at least one of the two or more time levels.

4. The time dimension management system as recited in claim 2, wherein the calendar coordinator provides links between the time periods associated with the two or more time levels and corresponding time periods on the standard calendar.

5. The time dimension management system as recited in claim 1 further comprising a time level selection controller to control presentation of a time level selector to allow user selection of one of the two or more time levels represented by the business time data structure.

6. The time dimension management system as recited in claim 1 further comprising a validity time indication controller to control presentation of a validity time indicator.

7. A method comprising:
 displaying, by a computer, a standard calendar to allow user selection on the computer of a time period, the standard calendar representing a standard time data structure;
 displaying, by the computer, a business calendar that represents a business time data structure, different from the standard time data structure, the business time data structure comprising two or more separate time levels, each of the two or more separate time levels representing a respective independent set of time periods, wherein each independent set of time periods is associated with a different unit of time, wherein at least one time period of the independent sets of time periods has a duration that is different from the time period included in the standard calendar, wherein each of the independent sets of time periods includes a respective continuum of time periods, wherein the displayed business calendar comprises multiple selectable cells each corresponding to a time period of a respective independent set of time periods, and wherein the multiple selectable cells of the displayed business calendar are graphically arranged to represent a hierarchy of the two or more time levels; and
 providing, by the computer, a visual, side-by-side navigation of both the standard calendar and the business calendar, such that when a new time period is selected in one of the displayed standard calendar and the displayed business calendar, a view of the other calendar is automatically updated by the computer to visually indicate the selected new time period.

8. The method as recited in claim 7, wherein providing the business calendar further comprises presenting a time dimensional selector as the business calendar, the time dimensional selector to allow user selection of at least one time period in at least one of the two or more time levels.

9. The method as recited in claim 8, further comprising providing links between the time periods associated with the two or more time levels and corresponding time periods on the standard calendar.

10. The method as recited in claim 7, further comprising controlling presentation of a time level selector to allow user selection of one of the two or more time levels represented by the business time data structure.

11. A computer readable memory containing computer executable instructions that, when executed, cause a computer to:
 display a standard calendar to allow user selection of a time period, the standard calendar representing a standard time data structure;
 display a business calendar that represents a business time data structure, different from the standard time data structure, the business time data structure comprising two or more separate time levels, each of the two or more separate time levels representing a respective independent set of time periods, wherein each independent set of time periods is associated with a different unit of time, wherein at least one time period of one of the independent sets of time periods has a duration that is different from the time period included in the standard calendar, wherein each of the independent sets of time periods includes a respective continuum of time periods, wherein the displayed business calendar comprises multiple selectable cells each corresponding to a time period of a respective independent set of time periods, wherein each of the multiple selectable cells comprises an unlabelled cell that is displayed without any text, wherein each unlabelled cell provides a visual representation of a placement of a time period corresponding to a respective unlabelled cell within the business time data structure, and wherein the multiple selectable cells of the displayed business calendar are graphically arranged to represent a hierarchy of the two or more time levels; and
 provide a visual, side-by-side navigation of both the standard calendar and the business calendar, such that when a new time period is selected in one of the displayed standard calendar and the displayed business calendar, a view of the other calendar is automatically updated to visually indicate the selected new time period.

12. A computer readable memory containing computer executable instructions that, when executed, cause a computer to:
 display a standard calendar to allow user selection of a time period, the standard calendar representing a standard time data structure;
 display a business calendar that represents a business time data structure, different from the standard time data structure, the business time data structure comprising two or more separate time levels, each of the two or more separate time levels representing a respective independent set of time periods, wherein each independent set of time periods is associated with a different unit of time, wherein at least one time period of one of the independent sets of time periods has a duration that is different from the time period included in the standard calendar, wherein each of the independent sets of time periods includes a respective continuum of time periods, wherein the displayed business calendar comprises multiple selectable cells each corresponding to a time period of a respective independent set of time periods, and wherein the multiple selectable cells of the displayed business calendar are graphically arranged to represent a hierarchy of the two or more time levels; and
 provide a visual navigation of both the standard calendar and the business calendar, such that when a new time period is selected in one of the displayed standard calendar and the displayed business calendar, a view of the other calendar is automatically updated to visually indicate the selected new time period.

13. The time dimension management system of claim 1,
 wherein the business time data structure represents a generational hierarchy of time levels comprising one or more parent time levels and one or more child time levels, and
 wherein, if a cell corresponding to one of the time periods of the parent time levels in the displayed business calendar is selected to select the new time period, the date selector controller automatically maintains a visual selection of a previously selected cell corresponding to one of the time periods of the child time level in the displayed business calendar and updates, based at least in part on the selected new time period, the view of the standard calendar to visually indicate the selected new time period.

14. The time dimension management system of claim 1,
 wherein the business time data structure represents a generational hierarchy of time levels comprising one or more parent time levels and one or more child time levels,
 wherein one of the parent time levels comprises a quarter time level, wherein a child time level of the quarter time level comprises a month time level, and wherein if a cell corresponding to a quarter time period of the quarter time level in the displayed business calendar is selected to select the new time period, the date selector controller automatically maintains a visual selection of a previously selected cell corresponding to one of the month time periods of the month time level in the displayed business calendar and updates, based at least in part on the selected new time period, the view of the standard calendar to visually indicate the selected new time period.

15. The time dimension management system of claim 14, wherein updating the view of the standard calendar to visually indicate the selected new time period comprises updating the view of the standard calendar to visually indicate the month time period of the selected new time period corresponding to the previously selected cell of the month time level.

16. The method of claim 7, wherein the business time data structure represents a generational hierarchy of time levels comprising one or more parent time levels and one or more child time levels, and wherein, if a cell corresponding to one of the time periods of the parent time levels in the displayed business calendar is selected to select the new time period, the computer automatically maintains a visual selection of a previously selected cell corresponding to one of the time periods of the child time level in the displayed business calendar and updates, based at least in part on the selected new time period, the view of the standard calendar to visually indicate the selected new time period.

17. The method of claim 7, wherein the business time data structure represents a generational hierarchy of time levels comprising one or more parent time levels and one or more child time levels, wherein one of the parent time levels comprises a quarter time level, wherein a child time level of the quarter time level comprises a month time level, and wherein if a cell corresponding to a quarter time period of the quarter time level in the displayed business calendar is selected to select the new time period, the computer automatically maintains a visual selection of a previously selected cell corresponding to one of the month time periods of the month time level in the displayed business calendar and updates, based at least in part on the selected new time period, the view of the standard calendar to visually indicate the selected new time period.

18. The method of claim 17, wherein updating the view of the standard calendar to visually indicate the selected new time period comprises updating the view of the standard calendar to visually indicate the month time period of the selected new time period corresponding to the previously selected cell of the month time level.

19. The computer readable memory of claim 12, wherein the business time data structure represents a generational hierarchy of time levels comprising one or more parent time levels and one or more child time levels, and wherein if a cell corresponding to one of the time periods of the parent time levels in the displayed business calendar is selected to select the new time period, the computer automatically maintains a visual selection of a previously selected cell corresponding to one of the time periods of the child time level in the displayed business calendar and updates, based at least in part on the selected new time period, the view of the standard calendar to visually indicate the selected new time period.

20. The computer readable memory of claim 12, wherein the business time data structure represents a generational hierarchy of time levels comprising one or more parent time levels and one or more child time levels, wherein one of the parent time levels comprises a quarter time level, wherein a child time level of the quarter time level comprises a month time level, and wherein, if a cell corresponding to a quarter time period of the quarter time level in the displayed business calendar is selected to select the new time period, the computer automatically maintains a visual selection of a previously selected cell corresponding to one of the month time periods of the month time level in the displayed business calendar and updates, based at least in part on the selected new time period, the view of the standard calendar to visually indicate the selected new time period.

21. The computer readable memory of claim 20, wherein updating the view of the standard calendar to visually indicate the selected new time period comprises updating the view of the standard calendar to visually indicate the month time period of the selected new time period corresponding to the previously selected cell of the month time level.

* * * * *